US 6,681,267 B2

United States Patent
Ohmura et al.

(10) Patent No.: US 6,681,267 B2
(45) Date of Patent: Jan. 20, 2004

(54) VIRTUAL COMPUTER SYSTEM AND METHOD FOR SWAPPING INPUT/OUTPUT DEVICES BETWEEN VIRTUAL MACHINES AND COMPUTER READABLE STORAGE MEDIUM

(75) Inventors: Yukiyoshi Ohmura, Kawasaki (JP); Yasushi Kawajiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 09/819,586

(22) Filed: Mar. 28, 2001

(65) Prior Publication Data
US 2002/0049869 A1 Apr. 25, 2002

(30) Foreign Application Priority Data
Oct. 25, 2000 (JP) .................................... 2000-325154

(51) Int. Cl.$^7$ .............................................. G06F 3/00
(52) U.S. Cl. .............................. 710/8; 710/5; 709/107
(58) Field of Search .............................. 710/5, 8, 13, 9, 710/62, 72; 709/100, 107

(56) References Cited

U.S. PATENT DOCUMENTS

| 4,811,276 A | * | 3/1989 | Suga .......................... 714/34 |
| 4,887,202 A | * | 12/1989 | Tanaka et al. ................. 703/21 |
| 5,253,344 A | * | 10/1993 | Bostick et al. ................. 710/8 |
| 5,506,975 A | * | 4/1996 | Onodera ......................... 709/1 |
| 5,996,026 A | * | 11/1999 | Onodera et al. ............... 710/3 |

FOREIGN PATENT DOCUMENTS

| JP | 3-282828 | 12/1991 |
| JP | 9-274598 | 10/1997 |

* cited by examiner

*Primary Examiner*—Kim Huynh
(74) *Attorney, Agent, or Firm*—Greer, Burns & Crain, Ltd.

(57) ABSTRACT

A command for swapping I/O devices between virtual machines is provided. When the command is input, each of I/O devices designated to be swapped is detached from corresponding one of swap-source-side and swap-destination-side virtual machines, and then attached to the other virtual machine. Simultaneously, definition information for the I/O devices in a VM-configuration information file previously stored in a non-volatile storage device such as a magnetic disk is updated automatically so as to reflect the swap of the I/O devices. This configuration enables swap of I/O devices through a single operation and update of I/O definitions in the VM-configuration information.

12 Claims, 10 Drawing Sheets

```
* * * * * <I/O DEVICE SWAP FRAME> * * * * * *

COMMAND OR OPTION=>

X : I/O DEVICE SWAP AND UPDATE OF I/O
       DEFINITION OF VM

NAME OF VIRTUAL MACHINE=>
VIRTUAL I/O DEVICE (TO VM) =>
VIRTUAL I/O DEVICE (FROM VM) =>

```
* * * * * <I/O DEVICE SWAP FRAME> * * * * * *

COMMAND OR OPTION=>X

X : I/O DEVICE SWAP AND UPDATE OF I/O
       DEFINITION OF VM

NAME OF VIRTUAL MACHINE=>VM2
VIRTUAL I/O DEVICE (TO VM) =>351
VIRTUAL I/O DEVICE (FROM VM) =>350

VM I/O DEFINITION BEFORE SWAP

|  | REAL I/O DEVICE | VIRTUAL I/O DEVICE | ALLOCATION |
|---|---|---|---|
| VM1 | 150 | 350 | UNDER ALLOCATION |
| VM2 | 151 | 351 | UNDER ALLOCATION |

SWAP OF I/O DEVICES

VM I/O DEFINITION AFTER SWAP

|  | REAL I/O DEVICE | VIRTUAL I/O DEVICE | ALLOCATION |
|---|---|---|---|
| VM1 | 151 | 350 | UNDER ALLOCATION |
| VM2 | 150 | 351 | UNDER ALLOCATION |

VIRTUAL COMPUTER SYSTEM AND METHOD FOR SWAPPING INPUT/OUTPUT DEVICES BETWEEN VIRTUAL MACHINES AND COMPUTER READABLE STORAGE MEDIUM

BACKGROUND OF THE INVENTION

1. Field of the Invention

The present invention relates to a virtual computer system and a method for swapping input/output devices (hereinafter referred to as "I/O devices") between virtual machines and a computer readable storage medium, and more particularly to a virtual computer system and method for swapping I/O devices between virtual machines, which system and method provide a command function which enables I/O devices to be swapped between virtual machines through a single operation and enables simultaneous update of I/O definitions of the virtual machines stored in a VM-configuration information file, and computer readable storage medium thereof.

2. Description of the Related Art

Figure 10A:
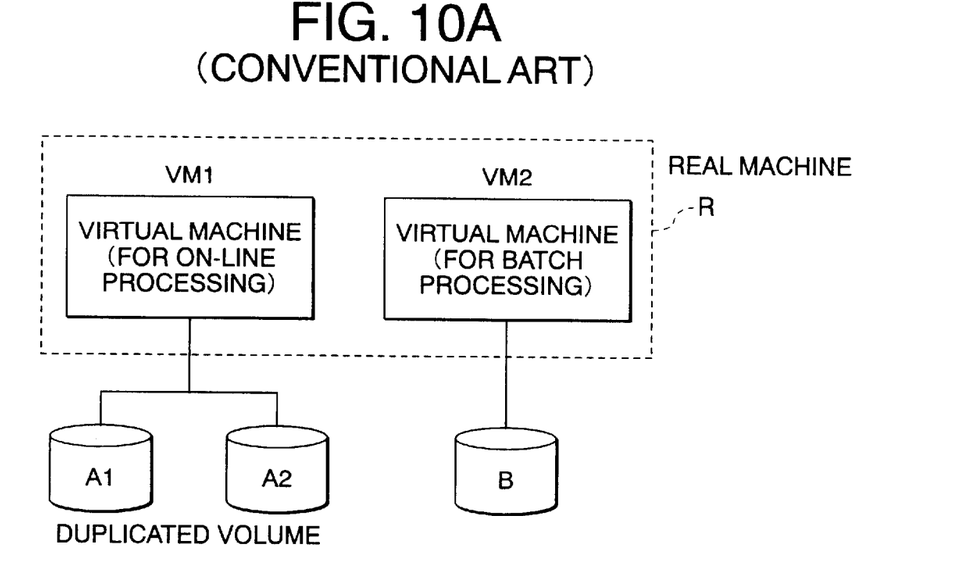
FIG. 10A shows a state before swap of I/O devices.
Figure 10B:
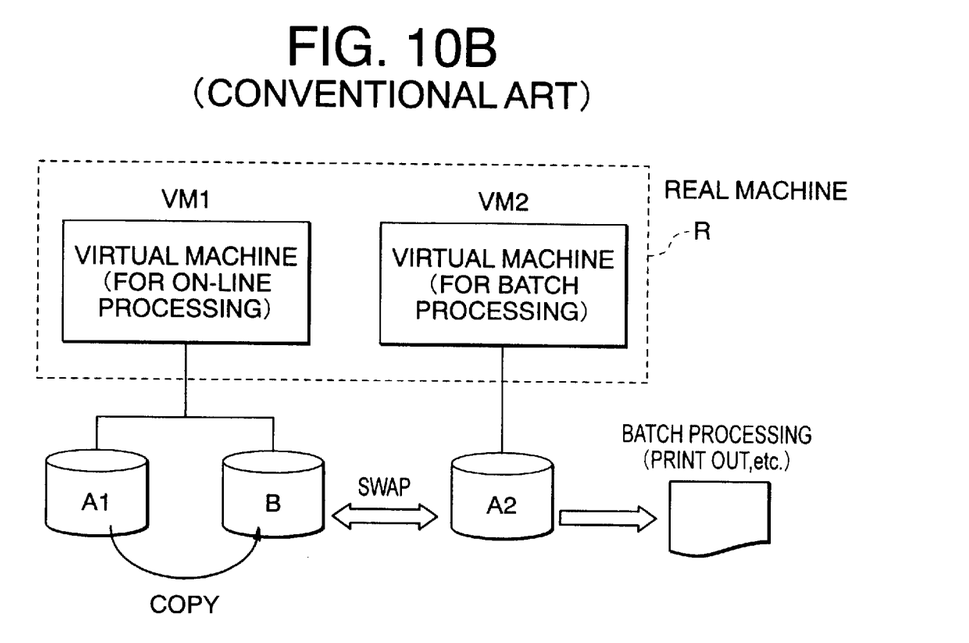
FIG. 10B shows a state after swap of I/O devices.

FIGS. 10A and 10B show an example system operation using a virtual computer system. The virtual computer system operates a single real machine as if a plurality of computers were present. Such virtual computers operating on a single real machine are called "virtual machines (VMs)."

In an example case, a virtual machine for daily business and a virtual machine for system development are operated simultaneously on a single real machine. In another example case, future introduction of two real machines is planned for on-line processing and batch processing, respectively, but on a temporary basis, a virtual machine for on-line processing and a virtual machine for batch processing are realized by a single real machine.

FIGS. 10A and 10B show an example in which a virtual computer system is operated according to the latter scheme. In the system, a virtual machine VM1 for on-line processing and a virtual machine VM2 for batch processing are operated on a single real machine R. The virtual machine VM1 uses duplicated volumes A1 and A2 (hereinafter called "dual volumes"). During on-line processing, the virtual machine VM1 writes identical data (e.g., document data and log data) in the volumes A1 and A2. When such data is subjected to batch processing such as batch print (document output, etc.), the following operation is performed. One (e.g., A2) of the dual volumes of the virtual machine VM1 is detached from the virtual machine VM1 and is attached to the virtual machine VM2; and a volume B of the virtual machine VM2 is detached from the virtual machine VM2 and is attached to the virtual machine VM1 in order to continue the dual-volume operation. After attachment of the volume B, the virtual machine VM1 copies data of the volume A1 to the volume B and resumes the dual-volume operation.

Figure 11:
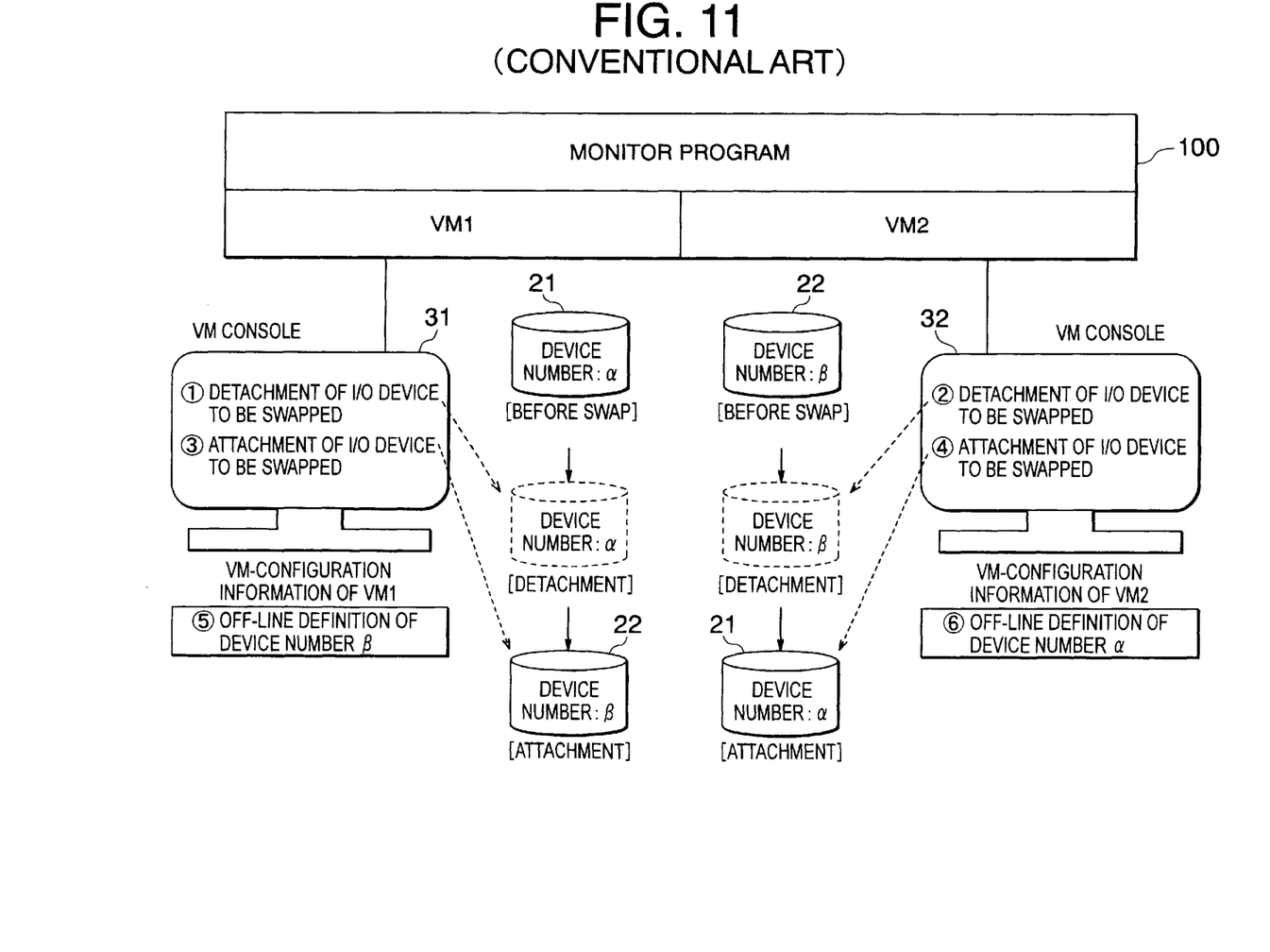
FIG. 11 shows a conventional technique.

FIG. 11 shows a conventional technique for operating a virtual computer system as described above.

A monitor program 100 is a control program for controlling virtual machines VM1 and VM2 in a virtual computer system. VM consoles 31 and 32 for operating the virtual machines VM1 and VM2 are connected to the virtual machines VM1 and VM2, respectively. When an I/O device 21 (device number: α) attached to the virtual machine VM1 is swapped with an I/O device 22 (device number: β) attached to the virtual machine VM2 at each of the VM consoles 31 and 32 an operator must input successive commands for detaching and attaching the designated I/O device to be swapped.

Further, simultaneously with the swap of the I/O devices, the operator must update definition information of the I/O devices, which information is held in the virtual computer system and used to allocate the I/O devices to the virtual machines when started.

Specifically, the operator must perform operations (1) to (6) shown in FIG. 11.

(1) Inputting from the VM console 31 a command for detaching the I/O device 21 (device number: α) from the virtual machine VM1.

(2) Inputting from the VM console 32 a command for detaching the I/O device 22 (device number: β) from the virtual machine VM2.

(3) Inputting from the VM console 31 a command for attaching the I/O device 22 (device number: β)to the virtual machine VM1

(4) Inputting from the VM console 32 a command for attaching the I/O device 21 (device number: α) to the virtual machine VM2.

(5) Updating the I/O definition information in the VM-configuration file in order to allocate the I/O device 22 (device number: β) to the virtual machine VM1.

(6) Updating the I/O definition information in the VM-configuration file in order to allocate the I/O device 21 (device number: α) to the virtual machine VM2.

With diversified employment of a virtual computer system, virtual machines have come to be used according to various operation schemes. Under such circumstances, use of an operation scheme in which I/O devices are swapped between a plurality of virtual machines has begun. However, due to the common thought that a virtual device configuration is present individually for each virtual machine, there has been present only a concept of attaching a certain I/O device to a virtual machine and detaching the certain I/O device from the virtual machine, but not a concept of swapping I/O devices between a plurality of virtual machines. Therefore, as commands for the monitor program 100, only a command for attachment of an I/O device and a command for detachment of an I/O device have been provided.

Therefore, conventionally, the operation for swapping I/O devices between virtual machines is very troublesome and requires a long time, as has been described with reference to the example of FIG. 11.

Moreover, since definition information regarding I/O devices swapped between the virtual machines is merely stored on memory of the virtual computer system, if, after swap of the I/O devices, the virtual computer system goes down due to a failure, the information indicting the fact that the I/O devices have been swapped is lost. Therefore, when the virtual machines are re-started after such a system down, the I/O devices are allocated to the virtual machines in accordance with the contents of a VM-configuration information file, which has been provided in advance on a nonvolatile storage device such as a magnetic disk. Therefore, the allocation of the I/O devices returns to the state before swap. In such a case, before starting the virtual machines, the operator must change the I/O definition information stored in the VM-configuration information file in such a manner that the swap of the I/O devices is reflected in the I/O definition information.

SUMMARY OF THE INVENTION

An object of the present invention is to solve the problems involved in swap of I/O devices between virtual machines such that a large number of commands must be input, that operation is complex and cumbersome, and that the risk of an operator's erroneous operation is high.

Another object of the present invention is to solve the problems involved in update of VM-configuration information such that, since the update of VM-configuration information must be performed separately, overall operation becomes complex and cumbersome, and that in some cases proper operation of virtual machines after the update cannot be guaranteed, because the update may involve errors.

Still another object of the present invention is to provide a virtual computer system which enables I/O devices to be swapped between virtual machines through a single operation.

Still another object of the present invention is to provide a method for swapping I/O devices between virtual machines in a virtual computer system, which method enables I/O devices to be swapped between the virtual machines through a single operation.

Still another object of the present invention is to provide a computer readable storage medium storing a program for swapping I/O devices between virtual machines in a virtual computer system, which program enables I/O devices to be swapped between the virtual machines through a single operation.

The present invention provides a virtual computer system comprises a real machine including first and second input/output devices; a plurality of virtual machines being operated on the real machine and including first and second virtual machines; an accepting and analyzing means for accepting and analyzing a single command which instructs swap of the first input/output device allocated to the first virtual machine with the second input/output device allocated to the second virtual machine; a detaching means for detaching the first and second input/output devices from the first and second virtual machines in response to input of the command; and an attaching means for attaching to the first virtual machine the second input/output device detached from the second virtual machine and for attaching to the second virtual machine the first input/output device detached from the first virtual machine.

Preferably, the virtual computer system further comprises a non-volatile storage device which stores input/output-device definition information, the definition information being used for allocating the input/output-devices to the virtual machines when the virtual machines are started; and an updating means for updating the input/output-device definition information stored in the storage device when the input/output devices are swapped.

The present invention also provides a method for swapping input/output devices in a virtual computer system having a plurality of virtual machines being operated on a real machine, and the method comprises accepting and analyzing a single command which instructs swap of a first input/output device allocated to a first virtual machine with a second input/output device allocated to a second virtual machine; detaching the first and second input/output devices from the first and second virtual machines in response to input of the command; attaching to the first virtual machine the second input/output device detached from the second virtual machine and attaching to the second virtual machine the first input/output device detached from the first virtual machine; and updating input/output definition information previously stored in a non-volatile storage device, the input/output definition information being used for allocating the input/output devices to the virtual machines when the virtual machines are started.

The present invention also provides a computer readable storage medium storing a program which enables I/O devices to be swapped between the virtual machines through a single operation.

BRIEF DESCRIPTION OF THE DRAWINGS

FIGS. 3A and 3B are diagrams showing a system configuration, on the basis of which an embodiment of the present invention will be described, wherein

FIGS. 5A and 5B are diagrams showing an example of a command input screen of a VM console, wherein

FIGS. 10A and 10B are diagrams showing an example system operation using a virtual computer system, wherein

DESCRIPTION OF THE PREFERRED EMBODIMENT

A virtual computer system according to the present invention provides a command function which enables an operator to swap I/O devices between virtual machines through a single operation and to simultaneously update I/O definitions of the virtual machines stored in a VM-configuration information file.

A command for swapping I/O devices between virtual machines is provided for the virtual computer system according to the present invention. When the command is input, each of I/O devices designated to be swapped is detached from corresponding one of swap-source-side and swap-destination-side virtual machines, and then attached to the other virtual machine. Simultaneously, definition information for the I/O devices in a VM-configuration information file stored in a non-volatile storage device such as a magnetic disk is updated automatically so as to reflect the swap of the I/O devices.

Figure 1:
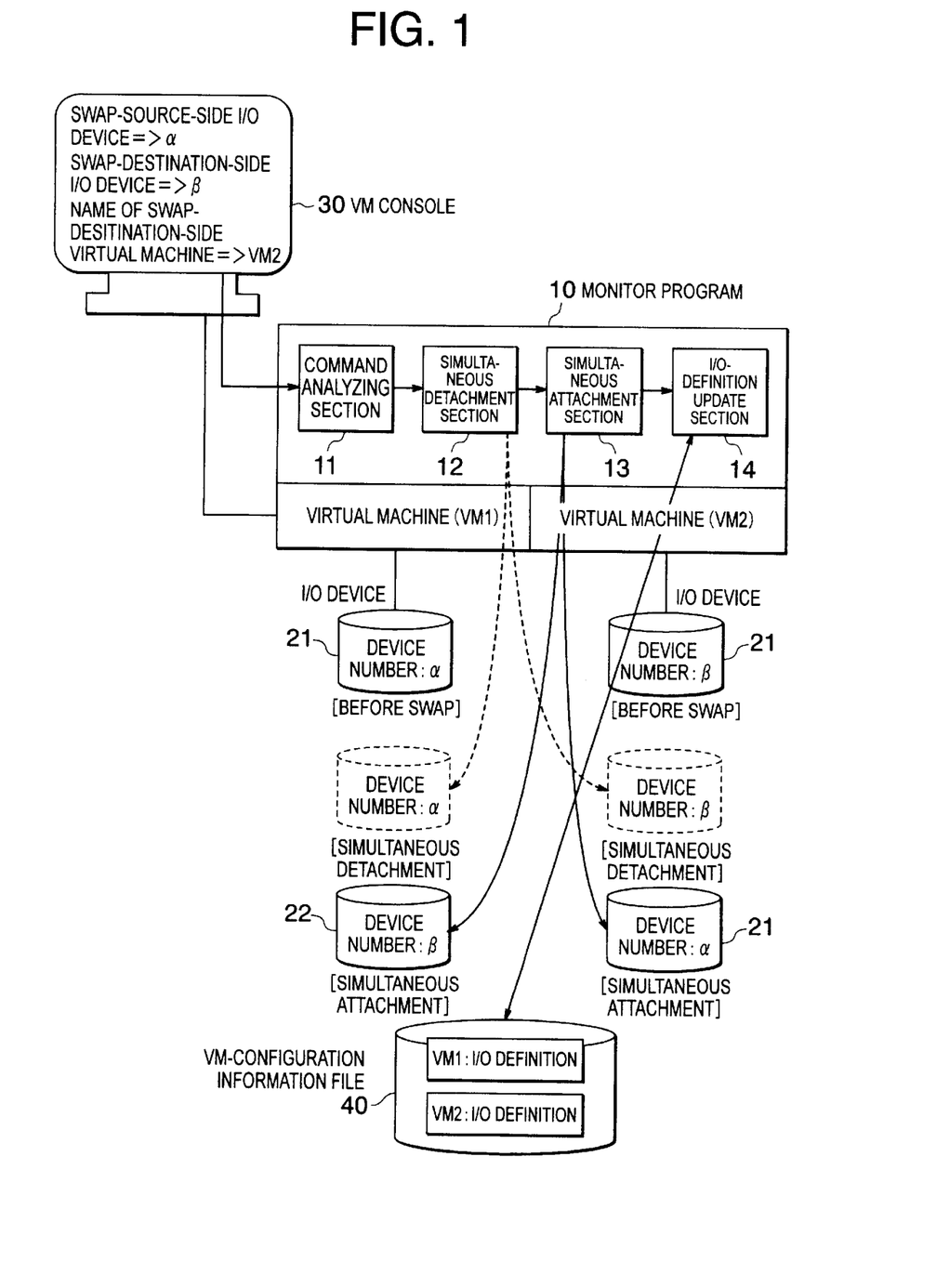
FIG. 1 is an explanatory view showing the general concept of the present invention.

FIG. 1 is an explanatory view showing the general concept of the present invention.

A monitor program 10 is a control program for controlling virtual machines VM1 and VM2 in a virtual computer system. I/O devices 21 and 22 are peripheral devices such as an external storage device and a printer; and device numbers are allocated to the I/O devices 21 and 22 for the purpose of identification. The device numbers are used as device addresses. At present, the I/O device 21 (device number: α) is allocated to the virtual machine VM1 and the I/O device 22 (device number: β) is allocated to the virtual machine VM2.

A VM console 30 is a console used for operating the virtual machine VM1. A VM-configuration information file 40 is provided on an external storage device and adapted to store information regarding definitions of I/O devices which are allocated to the virtual machines when the virtual machines are started. The definitions of I/O devices will be referred to as "I/O definitions".

The monitor program 10 includes a command analyzing section 11, a simultaneous detachment section 12, a simultaneous attachment section 13, and an I/O-definition update section 14. The command analyzing section 11 serves as a means for analyzing commands input from the VM console 30. In particular, the command analyzing section 11 has a function of accepting an I/O-device swap command, which instructs swap of I/O devices between virtual machines, and analyzing parameters and etc. appearing in the command. In the I/O-device swap command, an I/O device of a virtual machine on an swap source side, an I/O device of a virtual machine on an swap destination side, and the name of the virtual machine on the swap destination side are designated as parameters.

On the basis of results of the analysis of the I/O-device swap command, the simultaneous detachment section 12 simultaneously detaches I/O devices designated to be swapped, from the virtual machine on the swap source side and from the virtual machine on the swap destination side. The simultaneous attachment section 13 swaps the thus-detached I/O devices and simultaneously attaches them to the virtual machines such that the I/O device detached from the swap-source-side virtual machine is attached to the swap-destination-side virtual machine, and the I/O device detached from the swap-destination-side virtual machine is attached to the swap-source-side virtual machine.

The I/O-definition update section 14 updates the I/O definitions of the respective virtual machines stored in the VM-configuration information file 40 in such a manner that the result of the swap of the I/O devices is reflected in the I/O definitions in the VM-configuration information file 40.

Figure 2:
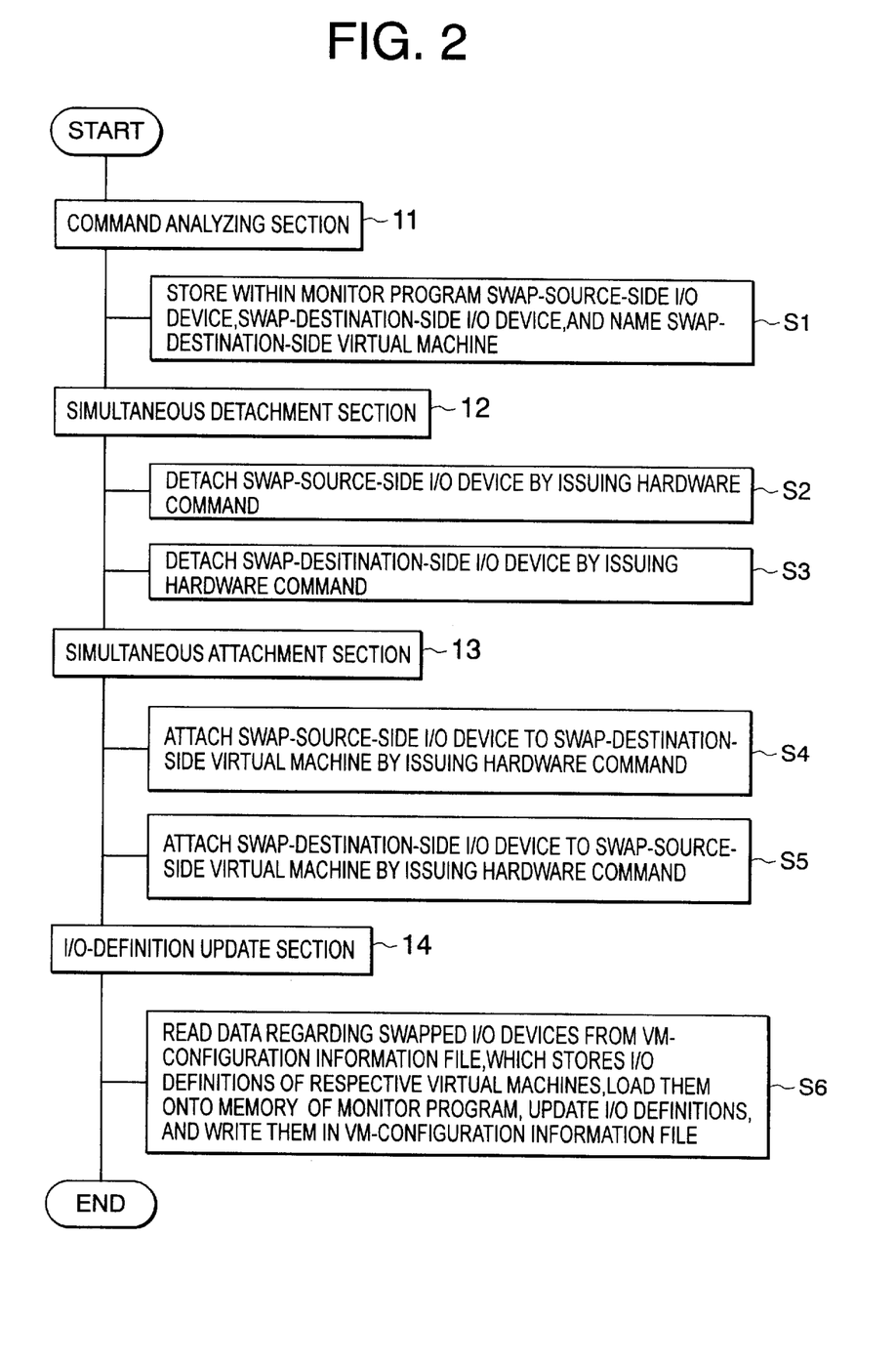
FIG. 2 is a processing flowchart of a monitor program.

FIG. 2 shows a processing flow of the monitor program 10 for the I/O-device swap command. Now, an example operation of the system shown in FIG. 1 will be described in accordance with the flowchart shown in FIG. 2.

Here, it is assumed that the name of the virtual machine VM1 and VM2 is "VM1" and "VM2", respectively. And, it is assumed that an I/O-device swap command is input, while a device number "α" is input as an swap-source-side I/O device, a device number "β" is input as an swap-destination-side I/O device, and "VM2" is input as the name of an swap-destination-side virtual machine. In this case, the monitor program 10 operates as follows.

First, the command analyzing section 11 checks whether the designated command parameters are correct. If the parameters are correct, the command analyzing section 11 stores within the monitor program 10 the device number "α" of the swap-source-side I/O device, the device number "β" of the swap-destination-side I/O device, and the name "VM2" of the swap-destination-side virtual machine (step S1). In an example case in which the I/O device of the device number "β" is not attached to the swap-destination-side virtual machine VM2, a command error is detected when the command is input. In such a case, the command analyzing section 11 outputs an error message on the VM console 30 and prompts the operator to re-enter the command.

Subsequently, the simultaneous detachment section 12 detaches the swap-source-side I/O device (device number: α) from the virtual machine VM1 by issuing a hardware instruction (step S2). Further, the simultaneous detachment section 12 detaches the swap-destination-side I/O device (device number: β) from the virtual machine VM2 by issuing a hardware instruction (step S3).

Subsequently, the simultaneous attachment section 13 attaches the swap-source-side I/O device (device number: α)—which has been detached from the virtual machine VM1—to the virtual machine VM2 by issuing a hardware instruction (step S4). Further, the simultaneous attachment section 13 attaches the swap-destination-side I/O device (device number: β)—which has been detached from the virtual machine VM2—to the virtual machine VM1, by issuing a hardware instruction (step S5). At this time, the device numbers of virtual I/O devices are maintained unchanged on the virtual machines VM1 and VM2.

Subsequently, the I/O-definition update section 14 reads data regarding the swapped I/O devices from the VM-configuration information file 40 which stores the I/O definitions of the virtual machine virtual machines, loads the data on the memory of the monitor program 10, and updates the I/O-device definition information. The I/O-definition update section 14 then writes the updated I/O-device definition information in the VM-configuration information file 40 (step S6).

Figure 3A:
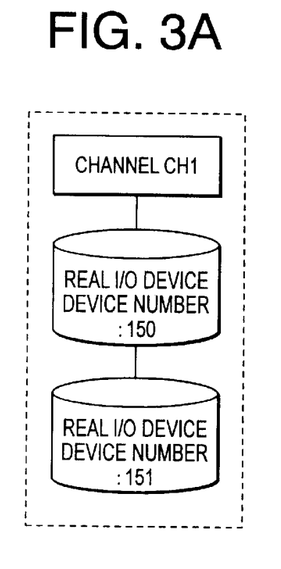
FIG. 3A shows a hardware configuration.
Figure 3B:
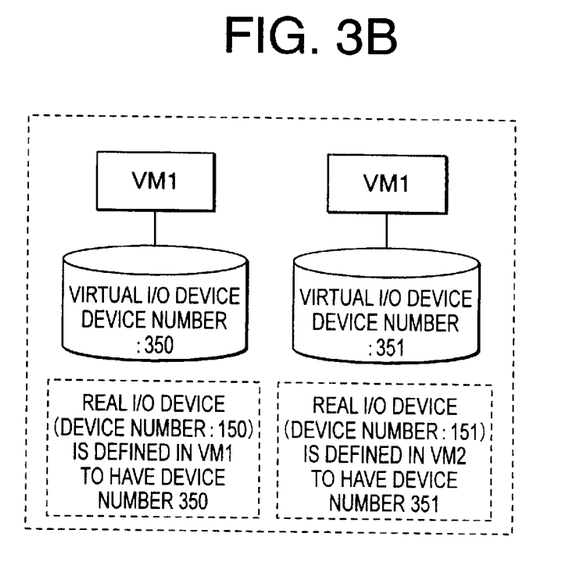
FIG. 3B shows I/O configurations of virtual machines.

The above-described processing will be described in more detail with reference to a concrete example. FIGS. 3A and 3B are diagrams showing a system configuration, which serves as a basis for an embodiment which will be described hereinbelow. FIG. 3A shows an actual hardware configuration regarding I/O devices to be swapped. Here, it is assumed that, as shown in FIG. 3A, two real I/O devices (device numbers: 150, 151) are connected to a channel CH1. These real I/O devices are allocated to the virtual machines VM1 and VM2, one device each. As shown in FIG. 3B, the real I/O device of the device number 150 is allocated to the virtual machine VM1 as a virtual I/O device (device number: 350), and the real I/O device of the device number 151 is allocated to the virtual machine VM2 as a virtual I/O device (device number: 351). The device numbers of the real I/O devices differ from the device numbers of corresponding virtual I/O devices used by the respective virtual machines.

Figure 4:
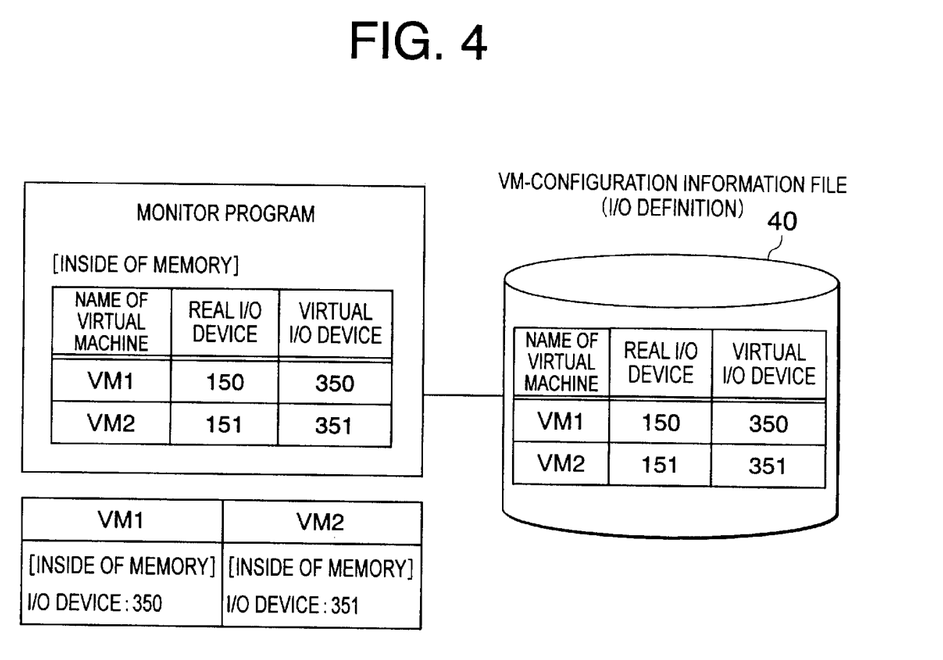
FIG. 4 is a diagram showing an example of management information before swap of I/O devices.

FIG. 4 shows management information before swap of I/O devices. In the memory of the monitor program 10, the device numbers 150 and 151 of the real I/O devices are registered for the virtual machines VM1 and VM2, and the device numbers 350 and 351 of corresponding virtual I/O devices are related thereto. The virtual machine VM1 stores in its memory the device number 350 of the corresponding virtual I/O device, and the virtual machine VM2 stores in its memory the device number 351 of the corresponding virtual I/O device. The same information as that stored by the monitor program 10 is stored in the I/O definition section of the VM-configuration information file 40.

Figure 5A:
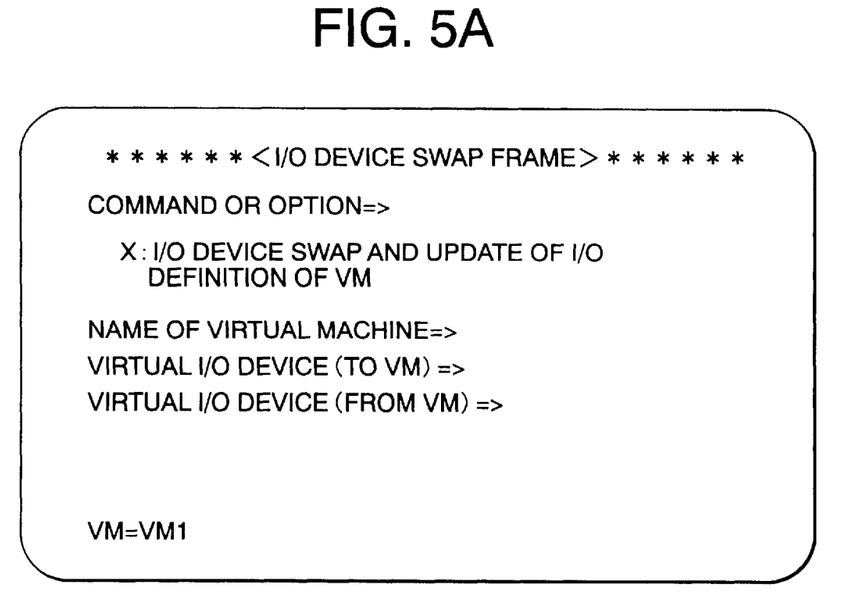
FIG. 5A shows a screen before input of necessary data.
Figure 5B:
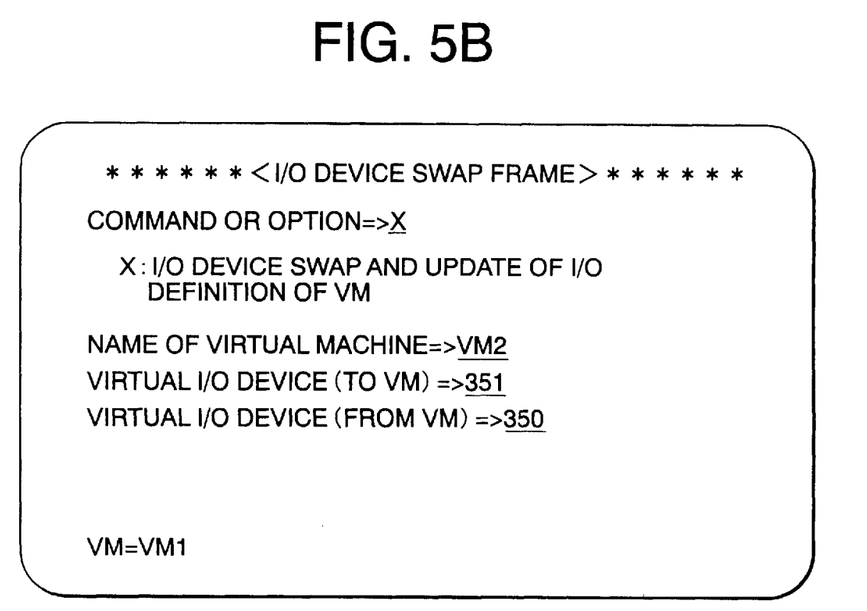
FIG. 5B shows a screen after input of necessary data.

FIGS. 5A and 5B show an example of a command input screen of the VM console 30, wherein FIG. 5A shows a screen before input of a command and parameters, and FIG. 5B shows a screen after input of the command and parameters. In the illustrated example, a command (command name: X) for instructing I/O-device swap and update of the I/O definitions of the virtual machines is input from the VM console 30 of the virtual machine VM1. Further, the name "VM2" of the swap-destination-side virtual machine, the device number "351" of the swap-destination-side virtual I/O device, and the device number "350" of the swap-source-side virtual I/O device are input. Although the device numbers designated as parameters here are the device numbers of the virtual I/O devices, devices which are to be swapped are real I/O devices.

Figure 6:
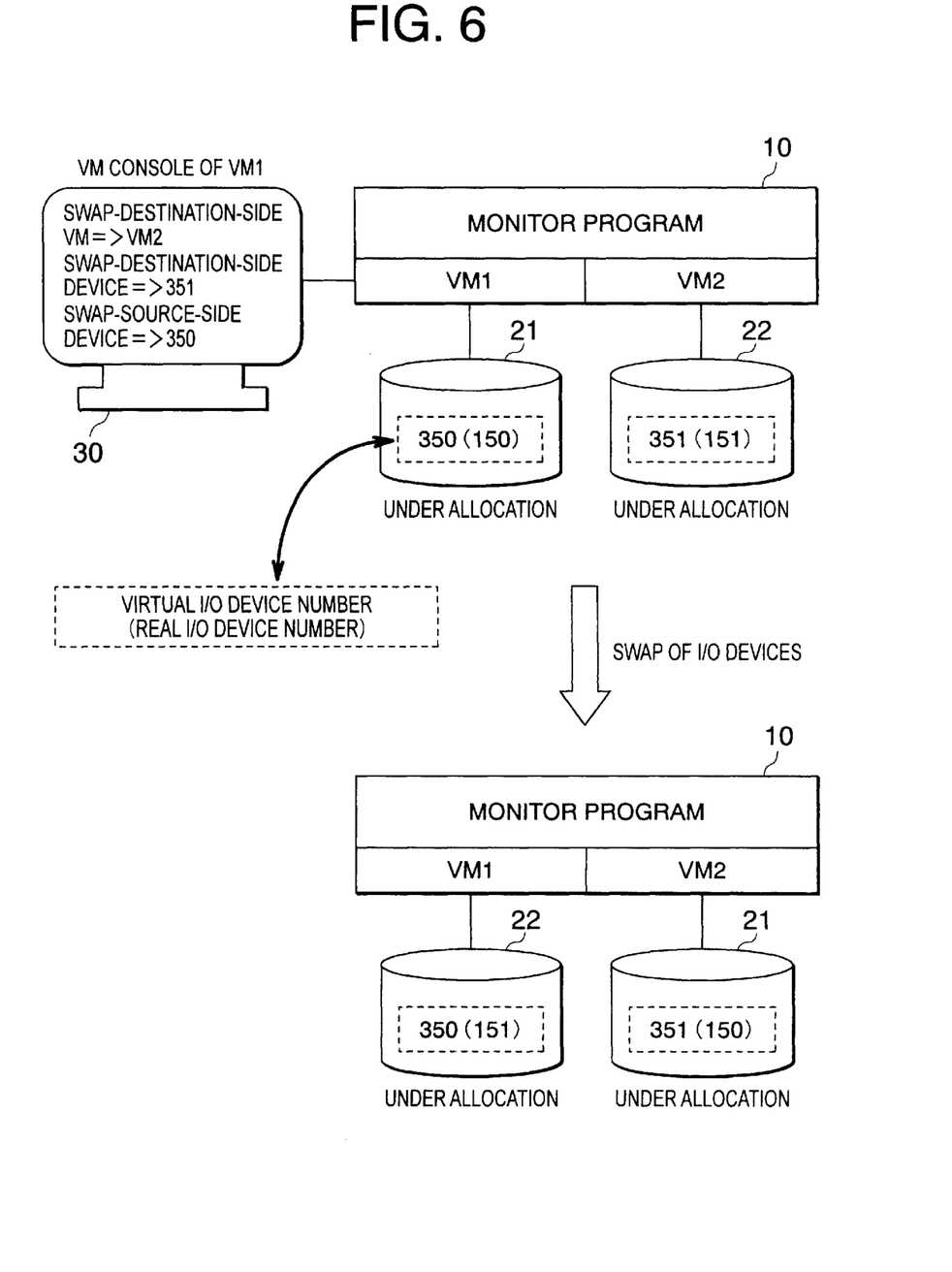
FIG. 6 is a diagram showing swap of I/O devices.

FIG. 6 shows a manner in which I/O devices are swapped. In response to input of the command shown in FIG. 5B, swap of the I/O device 21 allocated to the virtual machine VM1 with the I/O device 22 allocated to the virtual machine VM2 is performed as shown in FIG. 6. At this time, the device numbers of the real I/O devices are swapped naturally. However, the device numbers (350 and 351) of the virtual I/O devices are maintained unchanged. That is, the I/O-device management information on each of the memories of the virtual machines VM1 and VM2 is not changed.

Figure 7:
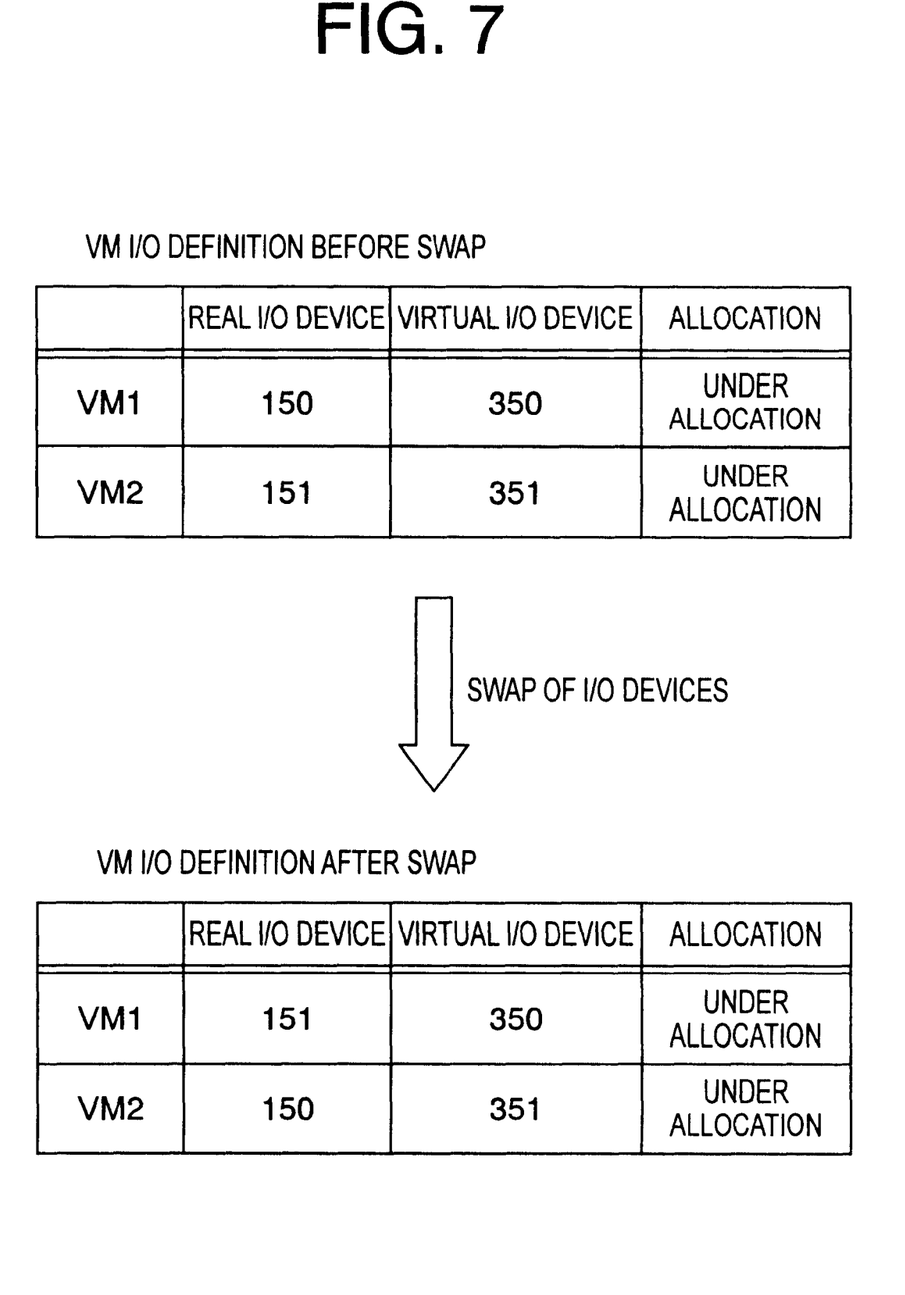
FIG. 7 is a diagram showing I/O definition information of each virtual machine before swap and that after swap.

FIG. 7 shows I/O definition information of each virtual machine managed by the monitor program 10 displayed before swap of I/O devices, and that displayed after the swap of I/O devices. The I/O definition information (allocation information) of each virtual machine managed by the monitor program 10 can be displayed on the VM console 30 by use of a display instruction command. The state of allocation before input of the I/O-device swap command is shown on the top side of FIG. 7, and the state of allocation after the input of the I/O-device swap command is shown on the bottom side of FIG. 7.

Figure 8:
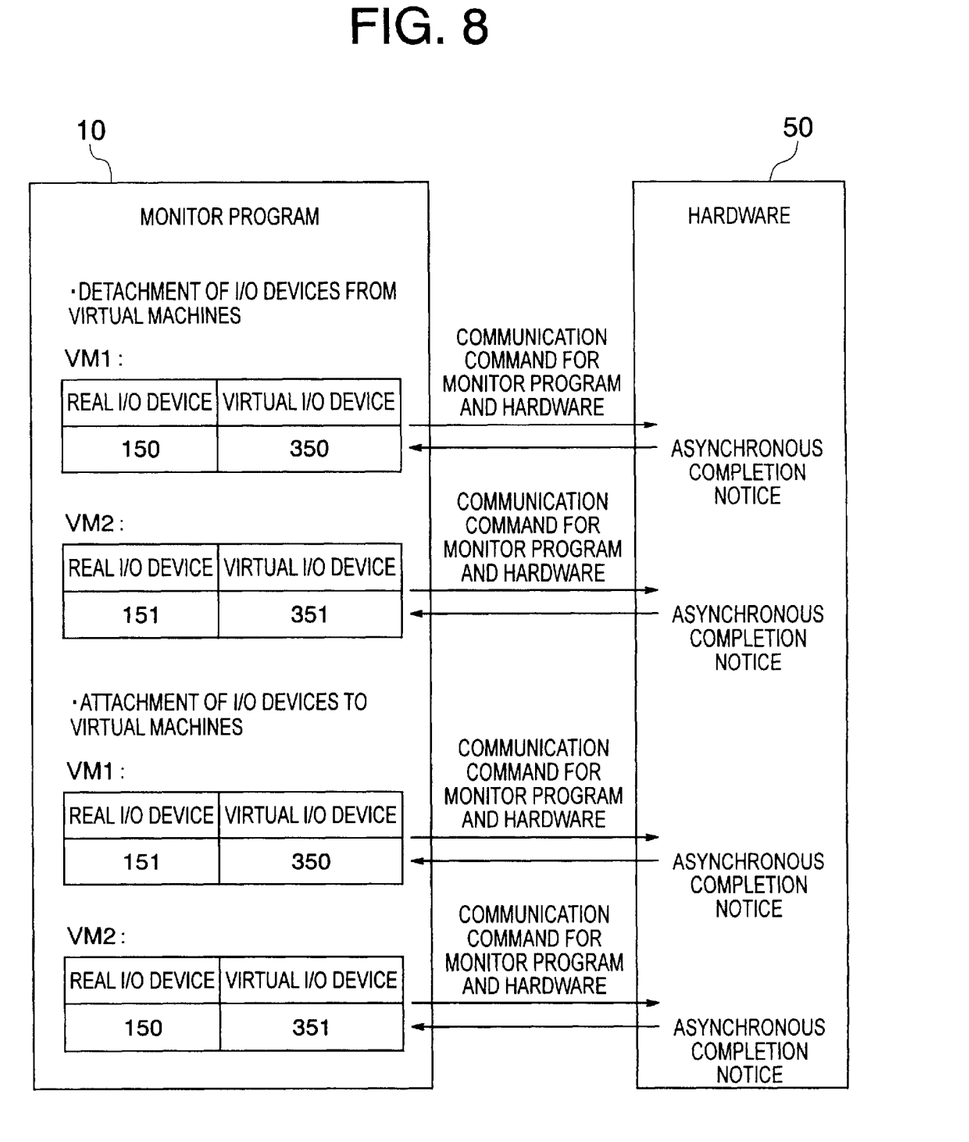
FIG. 8 is a diagram showing an interface between the monitor program and the hardware.

FIG. 8 shows an interface between the monitor program 10 and hardware 50 for effecting attachment and detachment of I/O devices. As shown in FIG. 8, detachment of I/O devices from the virtual machines and attachment of I/O devices to the virtual machines are performed by means of communication commands for the monitor program 10 and the hardware (including firmware) 50. This interface with the hardware 50 is similar to conventional interfaces. However, whereas in conventional interfaces a single hardware command is issued for one command, in the present invention four hardware commands are issued for one I/O-device swap command. Notification of completion of each hardware command is performed asynchronously. In view of this, after issuing a hardware command for detachment of the I/O devices, the monitor program 10 waits a completion notification asynchronously issued from the hardware 50, and then issues a hardware command for attachment of the I/O devices.

Figure 9:
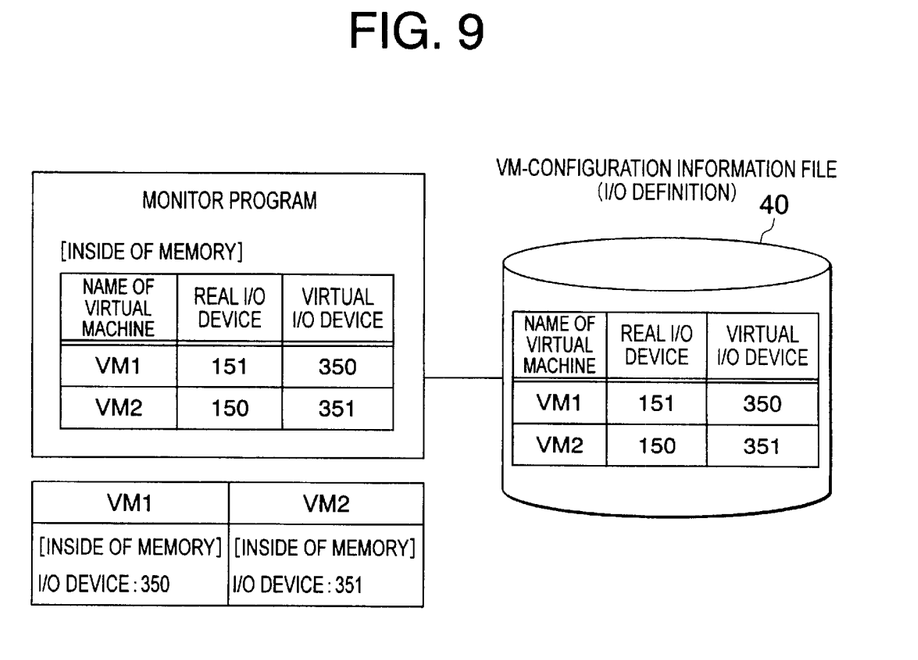
FIG. 9 is a diagram showing an example of management information after swap of I/O devices.

FIG. 9 shows the overall management information after swap of the I/O devices. In the memory of the monitor program 10, the device numbers 151 and 150 of the swapped real I/O devices are respectively set for the virtual machines VM1 and VM2 and the device numbers 350 and 351 of corresponding virtual I/O devices are related thereto. The virtual machine VM1 stores in its memory the device number 350 of the corresponding virtual I/O device, and the virtual machine VM2 stores in its memory the device number 351 of the corresponding virtual I/O device. This state is the same as that before the I/O-device swap. Simultaneously with the I/O-device swap, the I/O definitions in the VM-configuration information file 40 are updated, so that the same information as that which the monitor program stores after the swap is stored in the VM-configuration information file 40.

As describe above, since the present invention enables an operator to swap I/O devices between virtual machines through a single operation, the burden on the operator can be reduced. In addition, erroneous operations can be reduced. Moreover, even in a case in which the monitor program goes down after swap of I/O devices between virtual machines, the operations of the virtual machines re-started after such system down can be guaranteed.

What is claimed is:

1. A virtual computer system comprising:
   a real machine including first and second input/output devices;
   a plurality of virtual machines being operated on the real machine and including first and second virtual machines;
   an accepting and analyzing means for accepting and analyzing a single command which instructs to swap the first input/output device allocated to the first virtual machine with the second input/output device allocated to the second virtual machine;
   a detaching means for detaching the first and second input/output devices from the first and second virtual machines respectively in response to input of the command; and
   an attaching means for attaching to the first virtual machine the second input/output device detached from the second virtual machine and for attaching to the second virtual machine the first input/output device detached from the first virtual machine.

2. A virtual computer system according to claim 1,
   wherein the detaching means detaches first input/output device by issuing first hardware instruction and detaches second input/output device by issuing second hardware instruction on a basis of an analysis of the command; and
   wherein the attaching means attaches first input/output device by issuing third hardware instruction and attaches second input/output device by issuing forth hardware instruction on the basis of the analysis of the command.

3. A virtual computer system according to claim 2, wherein the attaching means issues the third and forth hardware instruction in a case that the detaching means receives asynchronous completion notification as a response to the first and second hardware instruction.

4. A virtual computer system according to claim 1, further comprising:
   a non-volatile storage device to store input/output-device definition information, the definition information being used to allocate the input/output devices to the virtual machines in a case that the virtual machines are started; and
   an updating means for updating the input/output-device definition information stored in the storage device in a case that the input/output devices are swapped.

5. A virtual computer system according to claim 4, wherein the definition information includes a name of the virtual machine, device number of a real input/output-device and device number of a virtual input/output-device, the device number of the real and virtual input/output-devices indicating the input/output-device which is allocated to the virtual machine.

6. A virtual computer system according to claim 4, wherein the accepting and analyzing means displays a screen to input the command.

7. A virtual computer system according to claim 6, wherein information which indicate the first input/output device, second input/output device and the second virtual machine are input to the screen as parameters of the command in a case that the first virtual machine is using the accepting and analyzing means.

8. A virtual computer system according to claim 7, wherein the accepting and analyzing means checks the parameters of the command which input into the screen.

9. A virtual computer system according to claim 7, wherein the definition information includes a name of the virtual machine, device number of a real input/output-device and device number of a virtual input/output-device, the device number of the real and virtual input/output-devices indicating the input/output-device which is allocated to the virtual machine; and wherein the information which indicate the first and second input/output devices are specified by their device number of the first and second virtual input/output-device.

10. A virtual computer system according to claim 4, wherein the detaching means detaches first input/output device by issuing first hardware instruction and detaches second input/output device by issuing second hardware instruction on a basis of the analysis of the command;

wherein the attaching means attaches first input/output device by issuing third hardware instruction, attaches second input/output device by issuing forth hardware instruction on the basis of the analysis of the command, and issues the third and forth hardware instruction in a case that the detaching means receives asynchronous completion notification as a response to the first and second hardware instruction; and wherein the updating means updates the definition information stored in the storage device in a case that the attaching means receives asynchronous completion notification as a response to the third and forth hardware instruction.

11. A method for swapping input/output devices in a virtual computer system having a plurality of virtual machines operated on a real machine, the method comprising:

accepting and analyzing a single command which instructs to swap a first input/output device allocated to a first virtual machine with a second input/output device allocated to a second virtual machine;

detaching the first and second input/output devices from the first and second virtual machines in response to input of the command;

attaching to the first virtual machine the second input/output device detached from the second virtual machine and attaching to the second virtual machine the first input/output device detached from the first virtual machine; and updating input/output definition information previously stored in a non-volatile storage device in a case that the first and second input/output devices are swapped, the input/output definition information being used to allocate the input/output devices to the virtual machines when the virtual machines are started.

12. A computer readable medium storing a program to implement with a computer swapping input/output devices in a virtual computer system having a plurality of virtual machines operated on a real machine, wherein the program causes the computer to perform:

accepting and analyzing a single command which instructs to swap a first input/output device allocated to a first virtual machine with a second input/output device allocated to a second virtual machine;

detaching the first and second input/output devices from the first and second virtual machines in response to input of the command;

attaching to the first virtual machine the second input/output device detached from the second virtual machine and attaching to the second virtual machine the first input/output device detached from the first virtual machine; and updating input/output definition information previously stored in a non-volatile storage device in a case that the first and second input/output devices are swapped, the input/output definition information being used to allocate the input/output devices to the virtual machines when the virtual machines are started.

\* \* \* \* \*